Nov. 8, 1938.   A. W. SHEPHERD   2,136,220
CONTROL SWITCH
Filed Aug. 16, 1935   3 Sheets-Sheet 2
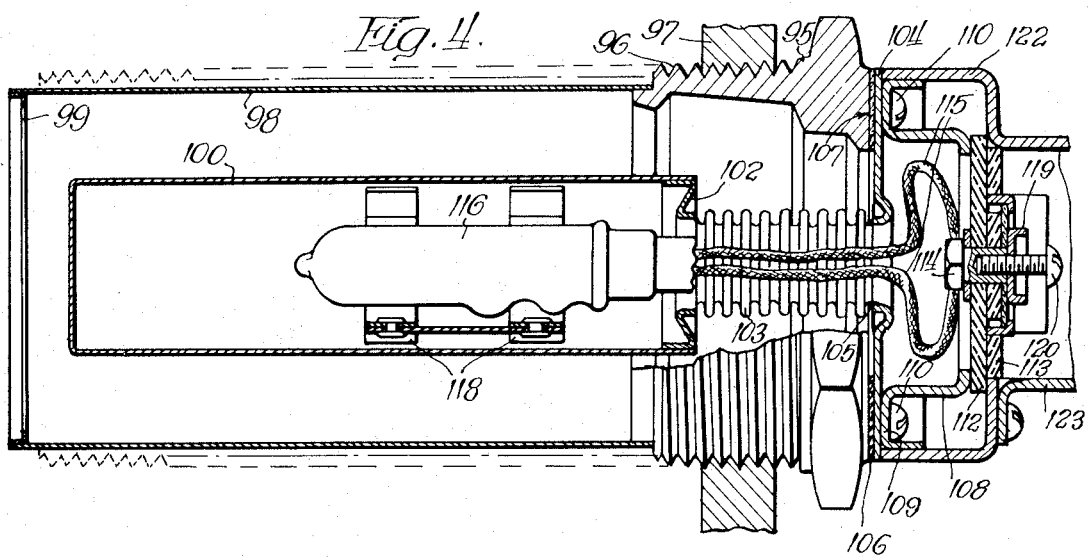
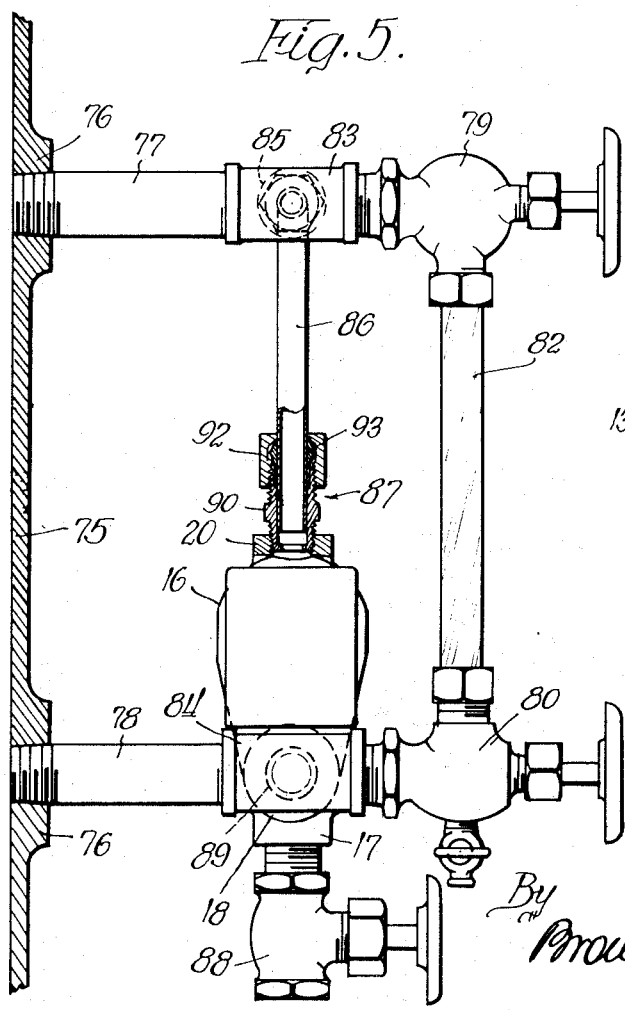
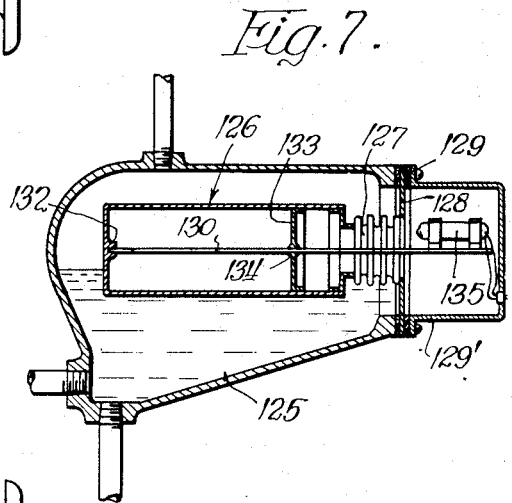
Inventor:
Alfred W. Shepherd
By Brown Jackson Boettcher Dienner
Attys.

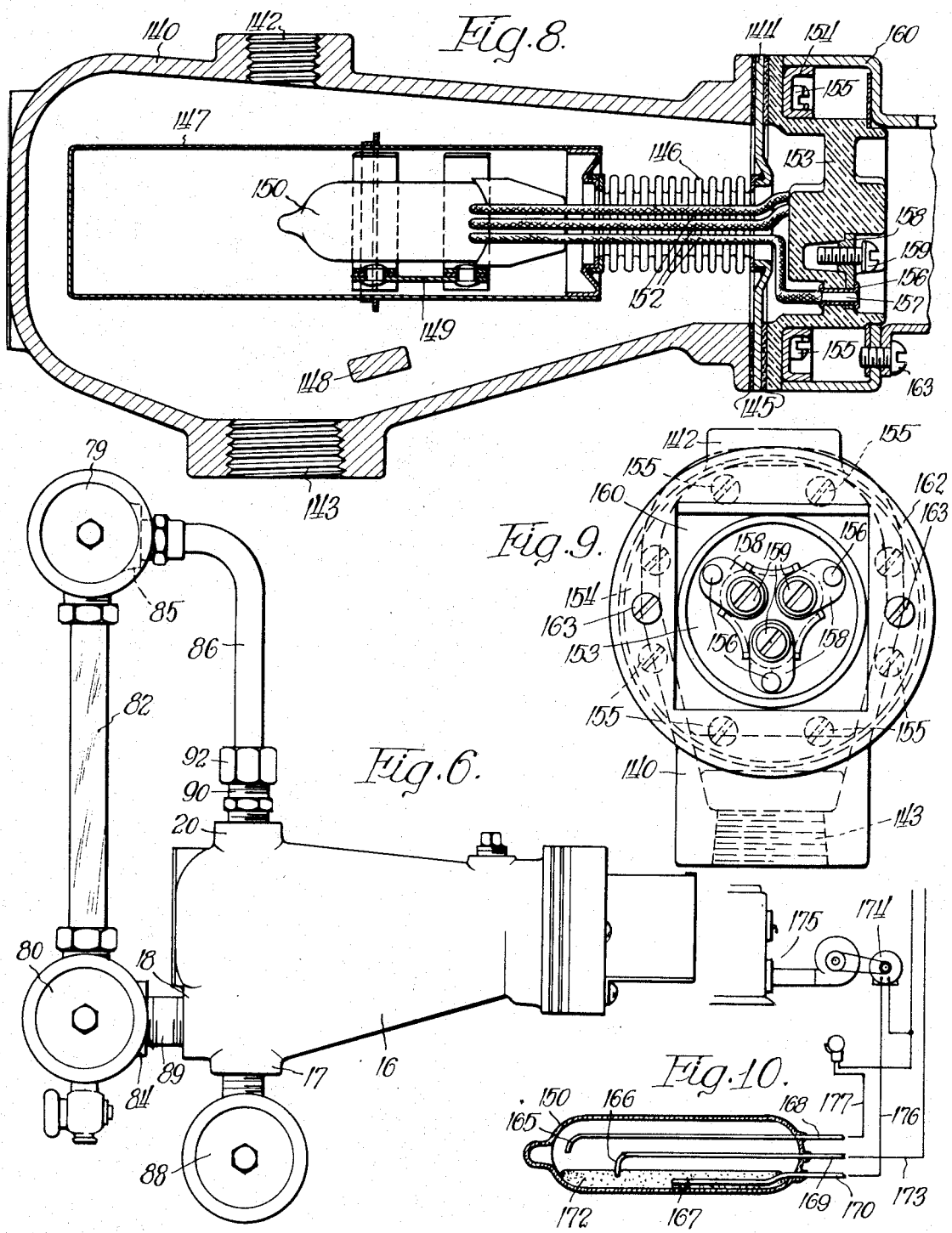

Patented Nov. 8, 1938

2,136,220

UNITED STATES PATENT OFFICE 2,136,220

CONTROL SWITCH

Alfred W. Shepherd, Maplewood, N. J., assignor of one-half to Oscar F. Carlson Company, Chicago, Ill., a corporation of Illinois, and one-half to Everett N. McDonnell, Chicago, Ill.

Application August 16, 1935, Serial No. 36,447

1 Claim. (Cl. 200—84)

This invention relates to control switches, and is directed more particularly to control switches for controlling the level of water in boilers of steam heating systems and the like, although the underlying principles of construction and operation of the present control switch are not limited to this particular field, but may be employed to provide a control switch mechanism wherever a float-controlled switching device is found necessary or desirable.

In its preferred embodiment, the present invention provides a device which is intended to operate a switch when the water level in a boiler or the like reaches a certain maximum, and with a certain differential is adapted to operate the switch in the reverse manner when the level drops a predetermined amount.

The switch of the present invention is housed entirely within a float member disposed for movement by the liquid, and is responsive to movement of the float in response to variations in level of the liquid for closing and opening an electric circuit. The circuit controlled by the switch may be connected to actuate a control valve for admitting more water to a boiler or the like, or it may be connected to operate a suitable pump or to stop the burner in case of low water or to do both. It may operate any other desired heating mechanism or in combination with a suitable alarm it may be used to indicate high or low liquid level in a tank or boiler.

The float of the present invention is preferably a light weight hollow closed cylinder formed of sheet metal or the like, and provided with suitable means for supporting the switch in predetermined position within the interior thereof. The float is supported in the liquid the level of which is to be controlled, by a flexible supporting means capable of allowing the float to move in accordance with variations in the liquid level, but which at the same time serves as a flexible seal for closing the end of the float through which the conductors, leading to the switch contacts within the float, are led out for connection to the control circuit.

Another feature of the present invention is the provision of a control switch disposed within the float, the float being mounted for movement on a flexible sealing bellows whereby no lever arms or actuating means need be connected to the float to secure operation of a remotely disposed switch corresponding to the movement of the float, which is a serious objection to the present type of float control switches with which I am familiar. This eliminates the need of packing or sealing means for lever arms or other elements and produces operation of the switch as a direct result of movement of the float, and conjointly therewith.

Another advantage possessed by the present invention is the provision of a terminal plate carried directly by the casing but sealed from the liquid within the casing, which plate receives the conductors from the switch within the float, through the flexible sealing means which forms a pivotal support for movement of the float in response to variations of liquid level.

It is also an object of the present invention to provide resilient supporting means for the switch casing within the float, which is capable of frictionally holding the switch casing in fixed position within the float, and can readily be assembled and adjusted in position within the interior of the float.

A still further object of the present invention is the provision of a control switch construction formed in a large degree of metal stampings which can be readily assembled and easily secured in relative position to provide a float-controlled switch of the type disclosed.

The present invention also lends itself to a construction wherein the switch may be directly supported in the wall of a boiler or the like, with the float disposed in contact with the water in the boiler, and directly responsive to the level thereof, while the switch leads and control circuit is led outwardly of the open end of the float support to any desired device to be controlled.

A still further feature of the present invention resides in the manner in which the control switch or low water cut-off housing may be supported with respect to the gage glass of the boiler, and connected into the liquid system of the boiler by a quick hook-up arrangement.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 1 is a diagrammatic view on a reduced scale illustrating one manner in which the control switch of the present invention may be connected to a steam heating system or the like;

Figure 2 is a sectional view on an enlarged scale, taken through the control switch casing and associated mechanism;

Figure 3 is a sectional view through the float, disposed in one of the offset pockets 65 of the switch housing, with a suitable body of mercury disposed therein, whereby upon a change in angularity of the switch the mercury moves from one pocket to the other pocket, thereby bridging across the switch contacts or electrodes, or opening the circuit therebetween, depending upon the position of the electrodes with respect to the pockets. The dividing hump between the pockets controls the differential within which the switch will operate.

The switch is supported within the cylinder 49 by means of a pair of spring clip members 66, shown in detail in Figure 3, which are provided with flattened base portions 67 riveted or otherwise suitably secured to a supporting strip 68, as by means of rivets 69. The supporting strip 68 extends longitudinally of the cylinder 49 and adjacent each end thereof is provided with downwardly offset leg portions 70 terminating in suitably curved frictionally engaging finger pieces 72 which are adapted to engage the inner surface of the cylinder 49 for frictionally holding the switch casing 58 in fixed position therein. Two sets of spring fingers are provided, normally urged outwardly against the inner surface of the cylinder 49 for holding the clip members 66 in position such that the switch housing 58 is disposed substantially centrally of the cylinder 49 and at any desired position with respect to the ends of the cylinder.

In the operation of the control switch disclosed herein, liquid from the boiler or other device in which the liquid level is to be controlled enters the casing 16 through the inlet opening 18, and since the float cylinder 49 is hollow, it floats, due to the flexibility of the bellows 44, upon the surface of the liquid, assuming, when the liquid is up to the level indicated at 73, a substantially horizontally extending position, in which position the switch casing 58 is also supported by means of the spring clips engaging the same. As the level within the casing 16 lowers, the float cylinder 49 tends to lower, as shown in dotted line in Figure 2, and the float tends to rotate about a point substantially intermediate the ends of the flexible bellows 44, since the bellows are not of sufficient strength to support the weight of the float and switch housing when the float is not disposed in and subject to the buoyant effect of a liquid.

When the cylinder 49 assumes a position such that the radially flanged portion 56 of the ring 55 engages the upper surface of the web 57, the switch casing 58 will be inclined at such an angle with respect to the horizontal as to produce actuation of the switch operating means enclosed therein, thereby controlling the circuit extending through the conductors 22 and 23. For example, if desired the circuit may be maintained opened as long as the switch is maintained within the float in the position shown in Figure 2. Upon dropping of the float due to the lowering of the liquid level, therefore, the mercury flows into position such as to bridge between the switch contacts for closing the circuit, whereby the valve 8 will be opened to allow for inflow of liquid to the boiler 5, whereby a portion of this liquid will flow through the outlet 14 at the lower end of the gauge glass into the port 18 of the casing 16 to raise the float to a position such that the circuit is again broken, at which time the valve 8 will be closed to prevent further flow of liquid into the boiler.

If desired, the circuit may be arranged in the opposite manner, that is, with the float in the position shown in Figure 2, the circuit may be closed to maintain the valve 8 in closed position, whereby upon lowering of the float and pivoting of the same about the bellows to increase the angularity of the switch casing, the switch is opened to provide for release of the closing bias upon the valve 8, whereby the valve 8 will be opened by water pressure from the conduit 9 to produce a flow of liquid into the boiler 5 sufficient to raise the float to its position as shown in Figure 2. Obviously any desired circuit connections and operations may be produced by the operation of the float controlled switch, and in place of the valve 8 a pump, burner motor or other mechanism may well be substituted without departing from the underlying principles of the present invention.

As shown in detail in Figures 5 and 6, I may provide a quick hook-up arrangement for attaching the housing of the control switch to any desired boiler construction. Thus, in connection with a boiler, such as the boiler 75, I provide bosses 76 in the wall thereof suitably tapped to receive the horizontally extending pipes 77 and 78 normally extending to valves 79 and 80, respectively, of a gauge glass 82. Interposed between the valves 79 and 80 and the pipes 77 and 78 are a pair of T connections 83 and 84, having the intermediate portion thereof extending in a horizontal direction rearwardly of the pipes 77 and 78, as shown in Figure 6.

The upper T connection is adapted to receive a fitting 85 connected to a curved pipe 86 extending downwardly through the quick hook-up connection indicated generally at 87 into the top port 20 of the control switch housing 16. The lower port 17 of this housing has connected thereto a drain valve indicated generally at 88.

The horizontally extending port 18 of the housing 16 is provided with a short nipple 89 connecting the same to the T connection 84, whereby the housing 16 is connected at its top to the T connection 83 and at its lower end to the T conection 84, and is disposed intermediate the vertical extent of the gauge glass 82, whereby it is responsive to water levels within the range shown by the gauge glass.

In order to accommodate the housing 16 to any installation, I provide the quick hook-up connection 87 whereby the vertical extent of the gauge glass can be of various lengths and yet the housing can be coupled into the connection as shown. Thus there is provided the bushing 90, threaded into the vertically extending port 20 of the housing 16, and provided with a cylindrical inner surface adapted to receive the downwardly extending end of the pipe 86. The bushing is provided intermediate its ends with a polygonal surface adapted to be engaged by a suitable wrench for tightening the same into the threaded socket 20. The upper end of the bushing 90 is threaded to receive a packing gland nut 92 threading thereover and engaging about the pipe 86. The nut 92 is recessed to receive packing 93 which, upon tightening of the nut downwardly on the bushing, is adapted to compress the packing therebetween for sealing the external surface of the pipe 86. It is obvious that the pipe may be clamped in any desired vertical position with respect to the bushing 90 in this manner to accommodate various spacing of the T connections 83 and 84.

In Figure 4 I have disclosed a modified type of control switch which is adapted to be threaded directly into the side wall of a boiler, with the float subject to the level of the water in the boiler itself, and the switch terminals and leads disposed in position outwardly of the boiler wall.

This construction comprises a nipple member 95, which is provided with external threads 96 adapted to thread into a suitably tapped opening in a boiler wall 97. A suitable inwardly projecting sheet metal sleeve 98 is secured to the nipple 95, as by welding, soldering or the like, and is provided with a stiffening flange 99 at its free end. The sleeve 98 serves as a protection for the hollow light-weight metallic float member 100, which has its outer end 102 sealed to one end of a flexible sealing bellows 103 extending centrally through the nipple 95 and supported on the annular plate 104, as indicated at 105. A suitable annular gasket 106 is interposed between the plate 104 and the outer face 107 of the nipple 95.

Secured to the face 107 of the nipple 95 is a switch housing member 108, having an annular channel-shaped flange 109 receiving spaced bolts 110 for securing it to the nipple 95 over the plate 104. At the open side of the member 108 is provided an insulating disc 112 which, together with the disc 113 provides a support for a pair of switch terminals 114 supported therein. The terminals 114 are connected through flexible leads 115 to the glass envelope type mercury switch 116 supported by suitable brackets 118 within the float 100, in a manner similar to that described in connection with Figure 1.

Terminal lugs 119 are supported on the outer end of the terminals 114 and receive suitable terminal screws 120 for clamping conductors thereto to extend a control circuit through the switch 116. An outlet box comprising the member 122 secured to the face 107 of nipple 95 by laterally disposed screws, and having the outwardly and vertically extending portion 123 forming a box-like enclosure, is adapted to receive the cable which leads the circuit conductors to the terminal screws.

It is to be understood that the nipple 95 can be threaded to any desired axial length, so that it need not be threaded into the boiler wall to dispose the shield 98 entirely within the boiler in cases where the internal construction of the boiler does not permit such an arrangement.

In Figure 7 I provide a modified control switch mounting which is shown only diagrammatically, comprising a float housing 125, a float 126 therein, and sealed to the flexible bellows 127, which is secured to a supporting plate 128 clamped between the outer face of the housing and an annular clamping plate 129, whereby the interior of the float and bellows is sealed with respect to the interior of the housing 125. The interior of the float and bellows is sealed by a closure member 129' secured to the open face of the housing and preventing escape of liquid which might leak through the float or bellows.

At its unsupported end the float 126 has rigidly supported therein an arm member 130, as indicated at 132. Intermediate its ends the float is provided with an internal stiffening spider 133 providing a second support 134 for the arm 130. At its outer unsupported end the arm 130 provides a support for a mercury switch member 135, which member is thereby made responsive to movement of the float 126 to control a circuit in any desired manner. The switch, as well as its connections, is sealed from the interior of the housing 125 by the plate 128, bellows 127 and float 126.

This modified construction can be adapted to either the type of housing shown in Figure 1, or that shown in Figure 4, in which the housing is directly supported in the boiler wall.

In Figures 8 and 9 I provide a control switch especially adapted for liquid fuel tanks and the like, although it may obviously also be employed in the same manner as described in connection with the control switches shown in Figures 2 and 4.

The switch or float housing 140 is provided with ports 142 and 143, whereby the housing may be connected at any desired level within the tank. The housing is provided with a closure disc 144, clamped between gaskets 145, which disc at its center supports the projecting flexible bellows 146. The opposite end of the bellows carries a float 147 sealed thereto, whereby the interior of the float and bellows are sealed with respect to the interior of the housing 140. A suitable stop 148 limits lowering movement of the float 147.

Mounted within the float 147 is a suitable bracket member 149, similar to the bracket 66 of Figure 2, which supports the three electrode mercury switch 150 within the float, the switch and its circuits being shown in detail in Figure 10. The leads 152 for the switch are led outwardly through the bellows 146 to a terminal plate 153, preferably formed of insulating material. This plate 153 is clamped to the end of the housing 140 over the outermost gasket 145 by means of an annular channel-shaped ring 154 and screws 155.

Each of the leads 152 is connected to a terminal bushing 156 as shown at 157, the bushings 156 comprising tubular rivets securing terminal lugs 158 in position on the outer face of the plate 153. The terminal lugs 158 are provided with terminal screws 159 for securing outgoing conductors thereto. The terminal plate is enclosed within a suitable outlet box 160 having a peripheral flange 162 secured to the housing 140 by screws 163.

This provides a sealed enclosure within the float, flexible bellows and the terminal plate 153, in which the switch and its terminal connections are mounted. It sometimes occurs that a leak in the float 147 or in the flexible bellows develops. Where a device such as is here disclosed is employed in connection with a tank of oil, such leak, even though small, might become a serious matter. The seal provided by the plate 153 prevents the escape of fluid and constitutes an important feature of this construction.

As shown in Figure 10, the switch 150 is provided with three electrodes 165, 166 and 167, having outgoing leads 168, 169 and 170, respectively. A suitable body of mercury 172 is carried within the switch and acts as a contactor between the various electrodes.

The electrode 166 is connected to a suitable source of current through lead 169 and conductor 173, and in the normal position of the float a circuit is completed through electrode 166, mercury 172, electrode 167 and conductor 176 to a burner motor 174 operating a burner 175. Thus as long as the float remains in horizontal position the burner motor circuit is maintained closed and the burner operates.

As the level of liquid fuel in the tank commences to fall, the mercury 172 moves toward the left hand end of the switch, still maintaining the burner motor circuit, but also closing a circuit through electrode 165 and conductor 177 to an alarm device 178. The alarm device is therefore energized, indicating that the fuel level in the supply tank is below a predetermined point. If the level is not raised, the burner will still continue to operate for a certain period of time, and the float 147 will drop lower. At a predetermined point, the mercury 172 will move away from electrode 167, breaking the burner motor circuit, but still maintaining the alarm circuit. Obviously in place of the alarm circuit a valve might be actuated to switch from the low fuel supply tank to a reserve tank, if so desired.

By this means I prevent immediate shutting off of the heating mechanism when the alarm device is actuated, to prevent inconvenience or possible damage in cold weather, but provide for shutting off the burner when the level becomes dangerously low. The time interval between the actuation of the alarm circuit and shutting off of the burner is determined by the spacing of the electrodes within the switch and the rate at which fuel is fed from the tank to the burner.

It is therefore believed apparent that I have provided a control switch structure capable of operation in instantaneous response to movement of the float, wherein a switch will be operated in a certain manner when the liquid level is at the desired maximum, and, with a certain differential, will function to produce reverse operation of the switch when the liquid level has dropped a predetermined amount. The switch being contained within the hermetically sealed float, and having its conductors extending through the sealing and flexing bellows, provides a simplified and efficient structure whereby no motion of the float need be transmitted through sealing or packing means to a remotely disposed or externally positioned switch member.

Having described my invention in accordance with the patent statutes, what I claim as new and desire to secure by Letters Patent is:

In a control device of the class described, a float member including a substantially cylindrical body portion, a flexible bellows sealed to one end of said body portion and extending axially outwardly therefrom, a substantially cylindrical glass switch housing, spring clips for supporting said housing, resilient supporting means secured to said clips and engaging the inner periphery of said body portion to position said housing substantially axially within said float member, and flexible insulated conductors extending from said housing outwardly through said bellows.

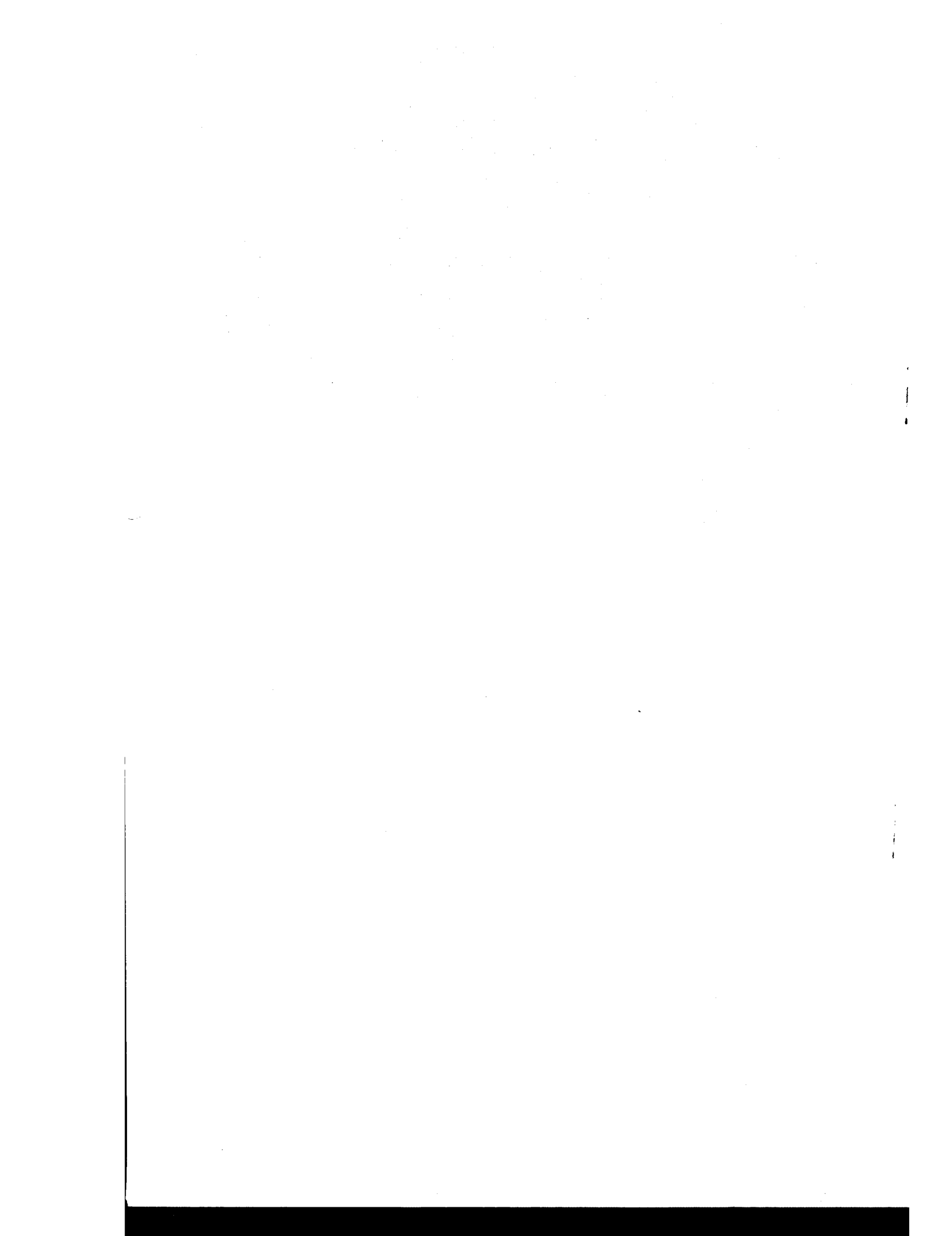

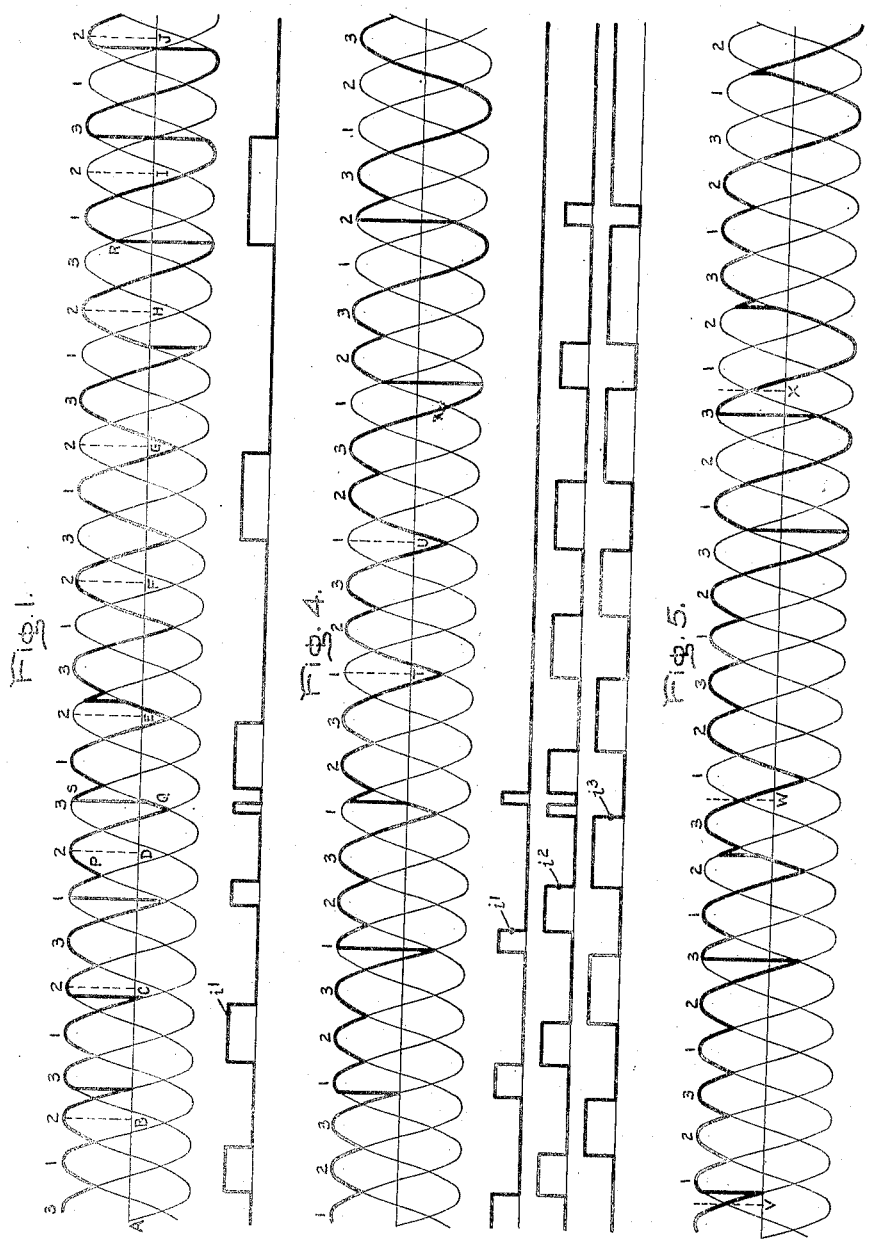

ALFRED W. SHEPHERD.